Figure 1:
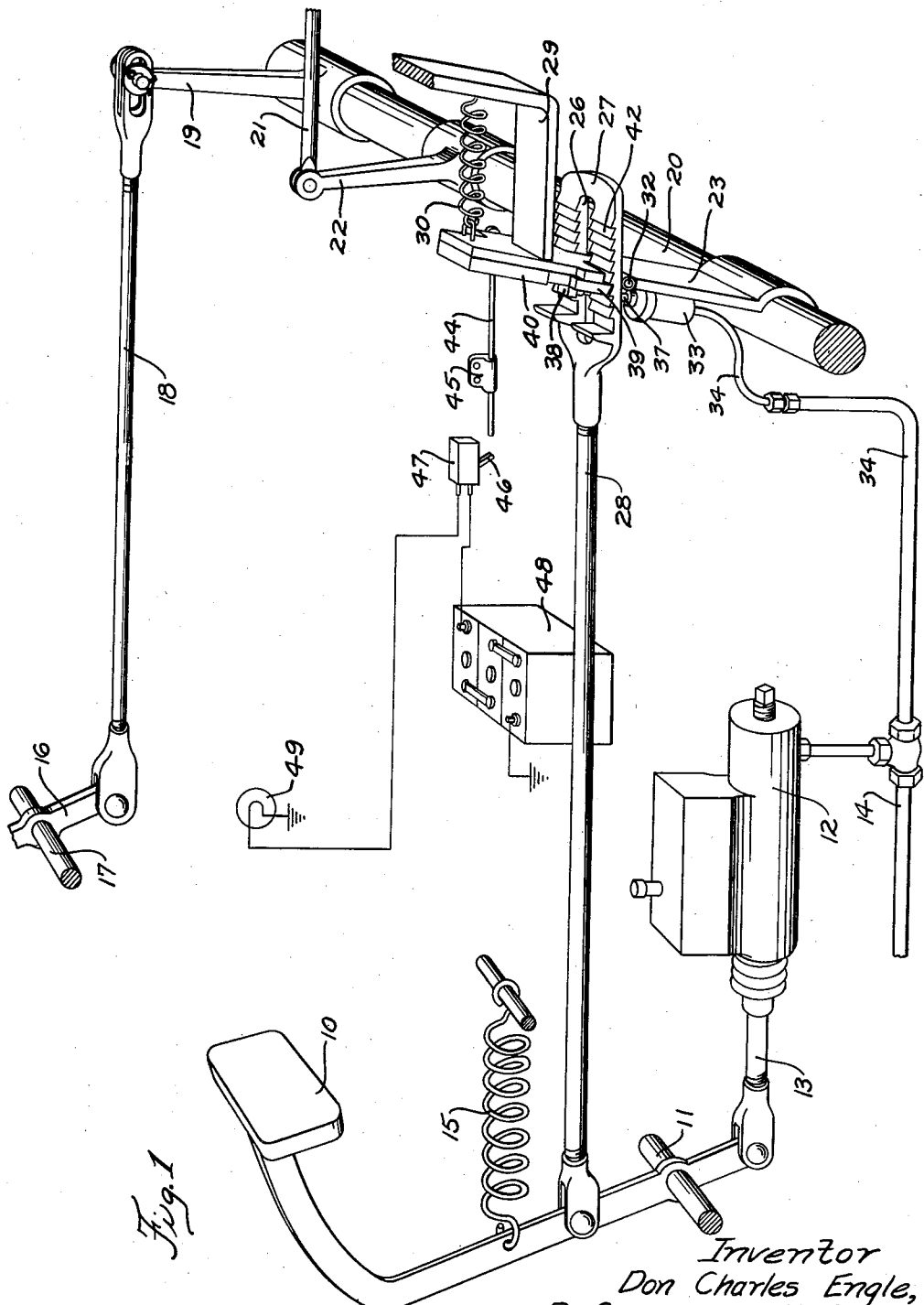

Inventor
Don Charles Engle,
By George John Korfhage,
Minturn & Minturn
Attorneys

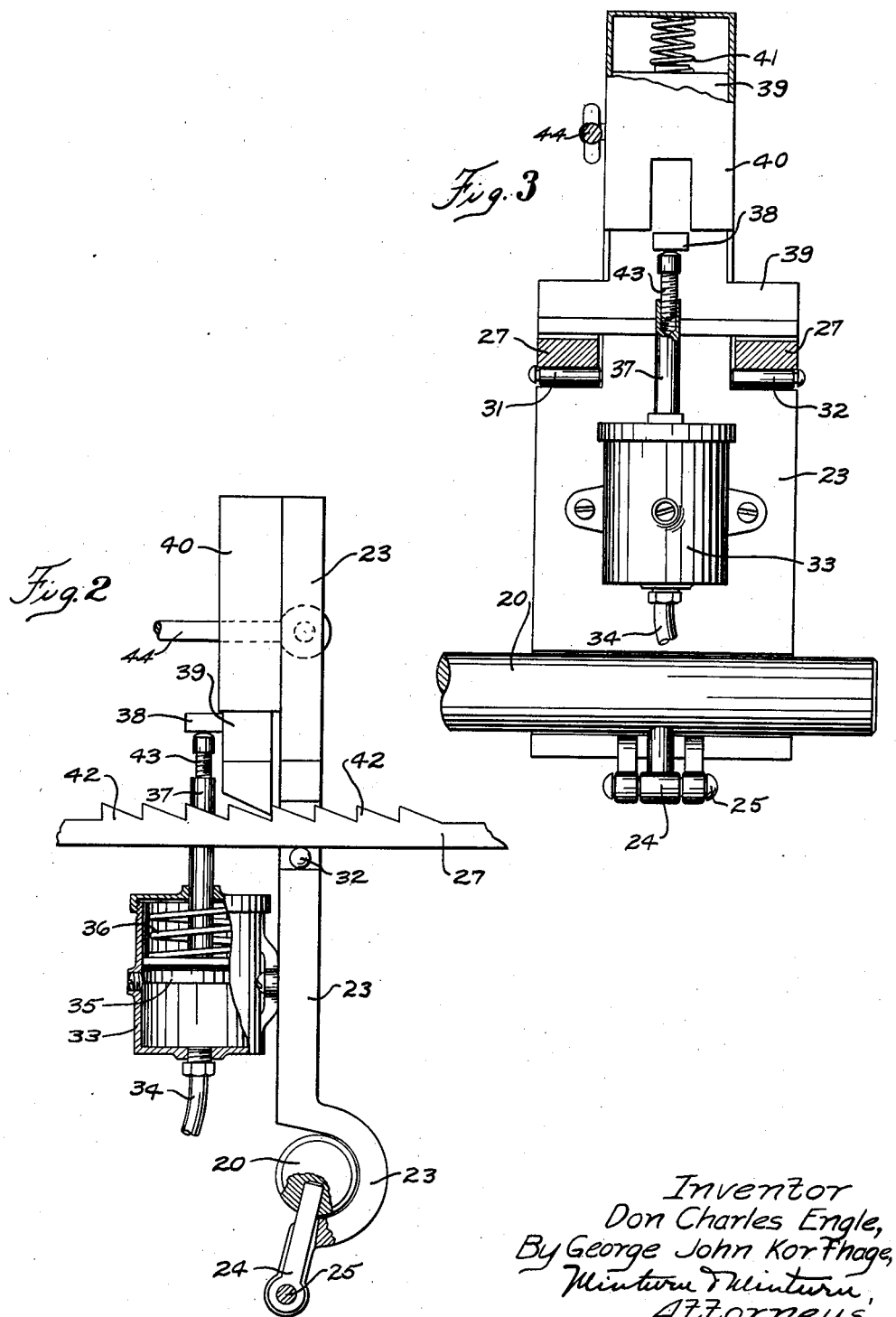

Patented Oct. 29, 1940

2,219,518

UNITED STATES PATENT OFFICE 2,219,518

HYDROMECHANICAL BRAKE CONNECTOR

Don Charles Engle and George John Korfhage,
Louisville, Ky.

Application April 3, 1939, Serial No. 265,630

8 Claims. (Cl. 188—106)

This invention relates to means for providing an interconnection between an hydraulic control and a mechanical control for brakes on vehicles, and has a primary object of providing connecting means which will operate automatically in the event the hydraulic braking system fails so that the mechanical brakes will be applied with the same pedal or lever normally employed to operate the hydraulic system.

The vehicle to employ the invention would be equipped with the usual hydraulic brake system and would also have in addition a mechanically operated brake system normally inoperative. The invention permits the use of either brake system independently of the other and the shifting from the hydraulic to the mechanical system is made automatically only when the hydraulic system should fail.

A further important object of the invention is to provide an interconnecting means between hydraulic and mechanical brake systems by an extremely simple mechanism which is durable, free from complications, and which will afford a high degree of safety in operation.

These and other objects of the invention will become apparent to those versed in the art in the following description of one particular form illustrated more or less diagrammatically in the accompanying drawings, in which Fig. 1 is a schematic view in perspective showing the invention as applied to conventional hydraulic and mechanical brake systems;

Fig. 2, a detail in side elevation on an enlarged scale of a latching mechanism; and Fig. 3, a detail in front elevation of that mechanism also on an enlarged scale.

Like characters of reference indicate like parts throughout the several views in the drawings.

Referring to the drawings, a foot pedal 10 pivoted on the shaft 11 normally controls fluid flow from a master cylinder 12 through the interconnecting rod 13, all in the usual manner to create pressure in the line 14 leading to the various brake shoe cylinders (not shown). Normally the pedal 10 is returned to its inoperative position by a spring 15. As long as the hydraulic system functions properly, the brakes are normally controlled by movement of the pedal 10 to create pressure in the line 14.

Means for controlling the mechanically operated brake system may take the conventional form of a lever 16 pivoted on a shaft 17 to have a brake rod 18 extending back to a lever 19 mounted on the brake cross shaft 20. A brake rod 21 connecting with the brake lever 22 goes to the mechanical set of brakes (not shown).

On this cross shaft 20 I mount an arm 23 to have its lower end rockably engaging a foot 24 fixed to and extending some little distance below the shaft, a pin 25, in the present form, serving as the connecting means. The arm 23 is carried upwardly from the pin 25 and around behind the shaft 20 to extend upwardly therefrom.

The upper end of the arm 23 shiftably passes through a slot 26 extending in a fore and aft direction through a slide 27 carried on the rear end of a rod 28 which has its forward end pivotally engaged to the pedal 10 above the shaft 11. The upper end of the arm 23 extends a distance above the slide 27 and is held in yielding abutment with any fixed member of the vehicle, such as the bracket 29, by means of a spring 30.

The arm 23, Fig. 3, carries a pair of rollers 31, 32 over which the slide 27 may travel. On the forward side of the arm 23 is mounted a fluid cylinder 33, the under end of which is interconnected with the hydraulic brake system pressure line 14 by the pipe line 34, a flexible conductor being inserted in the line to permit travel of the arm 23 relatively to the line. This cylinder 33 carries a piston 35, Fig. 2, normally urged to the lower end of the cylinder by means of a spring 36. The piston 35 has a rod 37 extending upwardly through the top head of the cylinder into the path of an abutment 38 fixed on the forward side of a latch bar 39.

This latch bar 39 is free to slide up and down on the arm 23 and has its upper portion carried within a housing 40 fixed to the arm 23. A spring 41 in the housing 40 normally urges the latch 39 downwardly against the slide 27, the latch 39 having a widened lower end to extend across the central slot 26 and resting on each part of the slide 27 beyond the slot 26. Thus the latch 39 is normally urged toward the slide 27 into the path of the teeth 42 formed on the upper side of the slide. However, when the pedal 10 is depressed to create pressure in the hydraulic brake line 14, that pressure is also transmitted through the line 34 to the cylinder 33 to cause the piston 35 to move upwardly and thus carry the rod 37 up to leave the latch bar 39 in opposition to the spring 41. While the rod 37 may be in direct contact with the abutment 38, an adjustment is preferably provided, one particular form being shown as a screw 43 screw-threadedly carried in the upper end of the rod 37 to be extensible therefrom, the head of the screw 43 being carried into direct contact with the abutment 38.

Thus, as long as the hydraulic brake system is operating, which means as long as pressure is created in the line 14 when the pedal 10 is depressed, the latch 39 is held upwardly out of the path of the teeth 42 and thus the rod 28 may reciprocate across the arm 23 in the travel as created by the pedal 10, all without creating any movement of the arm 23, the arm 23 being normally restrained by the spring 30 in an inoperative position.

However, should for any reason pressure not be generated in the line 14 by travel of the pedal 10, then the latch 39 remains in engagement with the teeth 42 of the slide 27, which engagement means that when the pedal 10 is pushed forwardly the rod 28 will carry the arm 23 forwardly and thereby rock the shaft 20 and apply the mechanically operated brakes through the rod 21, all without any lost motion or any interval of time intervening following depression of the pedal 10 and failure of pressure to be generated.

On the other hand should the mechanical brakes be applied through the lever 16 independently of any operation of the pedal 10, the shaft 20 will rotate and rock the lower end of the arm 23 rearwardly, but the upper end of the arm 23 will pivot about the lower end of the latch bar 39 without any interference from that arm 23.

Since the mechanically operated brakes are automatically brought into action upon failure of the hydraulic brake system, the driver would normally have no warning that the hydraulic system was failing to operate. In order to give a visual indication of this fact, any suitable means may be employed whereby forward travel of the arm 23 will close an electric switch to operate a signal within the view of the operator. In the particular diagrammatic representation indicated in Fig. 1, a rod 44 is attached to the side of the arm 23 and carried through any suitable guide 45 to be in the path of a switch arm 46 which extends from a switch 47 in a circuit including the usual battery 48 of the vehicle and a lamp 49 which may be mounted upon the instrument panel or any other selected position. When the pedal 10 pulls the arm 23 forwardly during the failure of the hydraulic system, the rod 44 will close the switch 47 upon each application of the brakes and thereby very effectively warn the operator of the true situation. Another indication may also be given to warn the operator when the brakes are worn or require re-adjustment which permits the pedal 10 to be depressed further than when the brakes are in the proper condition. This indication is given by the same lamp 49 and is brought about when the rear end of the slot 26 strikes the arm 23 to carry it forwardly slightly and thus shift the rod 44 to actuate the switch 47. The ends of the slot 26 are, of course, normally adjusted in reference to the position of the arm 23 so that the arm 23 is not struck thereby during normal conditions of the brakes.

No attempt has been made in the foregoing description and in the drawings to indicate protective means advisably used to prevent snow and mud and the like from interfering with the working of the structure. Such protective means are highly desirable but do not enter into the invention and have been omitted for the sake of preventing confusion.

While the invention has been shown and described in detail in the one particular form, it is obvious that the invention is applicable to any of the usual and well known mechanical and hydraulic brake systems found upon vehicles, and it is further obvious that mechanical changes may be employed all without departing from the spirit of the invention and we, therefore, do not desire to be limited to that precise form beyond the limitations as may be imposed by the following claims.

We claim:

1. For automatically operating a mechanical brake system upon failure of an hydraulic brake system, the combination with a brake control member, means for creating pressure in the hydraulic system controlled by said control member, and a rockable member in said mechanical system; of an arm positioned to actuate said rockable member in the direction of travel to shift said rockable member toward a brake applying position, a member shiftable in response to said control member, in proximity to said arm, interlocking means normally interengaging said shiftable member and said arm, and means responsive to pressure in said hydraulic system for releasing said interlocking means from said engagement, whereby said shiftable member may travel independently of said arm when said hydraulic system functions and will carry said arm therewith to operate the mechanical system upon failure of the hydraulic system, said rockable member consisting of a rocker shaft, and means hinging said arm to one side of said shaft whereby the arm will rock the shaft when pulled around thereagainst but will rock from the shaft in the opposite direction, a stop, and yielding means normally retaining the arm in abutment with said stop, said shiftable member having a forward travel limit abutment in the path of the arm.

2. For automatically operating a mechanical brake system upon failure of an hydraulic brake system, the combination with a brake control member, means for creating pressure in the hydraulic system controlled by said control member, and a rockable member in said mechanical system; of an arm positioned to actuate said rockable member in the direction of travel to shift said rockable member toward a brake applying position, a member shiftable in response to said control member, in proximity to said arm, interlocking means normally interengaging said shiftable member and said arm, and means responsive to pressure in said hydraulic system for releasing said interlocking means from said engagement, whereby said shiftable member may travel independently of said arm when said hydraulic system functions and will carry said arm therewith to operate the mechanical system upon failure of the hydraulic system, said rockable member consisting of a rocker shaft, and means hinging said arm to one side of said shaft whereby the arm will rock the shaft when pulled around thereagainst but will rock from the shaft in the opposite direction, a stop, and yielding means normally retaining the arm in abutment with said stop, said shiftable member having a forward travel limit abutment in the path of the arm, and signal means actuated by travel of the arm to indicate brake and system conditions.

3. For a vehicle having an hydraulic brake system with a brake actuating pressure line, pressure means, a lever controlling pressure in said line, and a mechanical brake system with a rock member for actuating the brakes, the combination of an arm rockably mounted in relation to said rock member, a slide member shiftably carried by said arm, abutments on the slide member, means connecting said slide member with said lever, a latch bar on said arm normally urged into engagement with said abutment to cause said arm to move with the slide member upon shifting of said lever to its brake applying position, a stop, spring means normally urging said arm toward said stop, a cylinder connected with said pressure line, a piston in the cylinder, means normally urging the piston in a direction of travel opposite to that induced by pressure derived from said line, and a member interposed between said piston and said latch bar arranged to shift the bar from abutment engagement under pressure from said line.

4. For a vehicle having an hydraulic brake system with a brake actuating pressure line, pressure means, a lever controlling pressure in said line, and a mechanical brake system with a rock member for actuating the brakes, the combination of an arm rockably mounted in relation to said rock member, a slide member shiftably carried by said arm, teeth on the slide member, means connecting said slide member with said lever, a latch bar on said arm normally urged into engagement with said teeth to cause said arm to move with the slide member upon shifting of said lever to its brake applying position, a stop, spring means normally urging said arm toward said stop, a cylinder connected with said pressure line, a piston in the cylinder, means normally urging the piston in a direction of travel opposite to that induced by pressure derived from said line, and a member interposed between said piston and said latch bar arranged to shift the bar from tooth engagement under pressure from said line, said mechanical brake system having an operating lever and operating connection with said rock member, means hinging said arm to said rock member to carry the arm behind it in relation to said hydraulic brake pressure control lever whereby the rock member may be selectively rocked through said arm by said pressure control member and said mechanical system operating lever while said latch bar is engaged with said teeth.

5. For a vehicle having an hydraulic brake system with a brake actuating pressure line, pressure means, a lever controlling pressure in said line, and a mechanical brake system with a rock member for actuating the brakes, the combination of an arm rockably mounted in relation to said rock member, a slide member shiftably carried by said arm, teeth on the slide member, means connecting said slide member with said lever, a latch bar on said arm normally urged into engagement with said teeth to cause said arm to move with the slide member upon shifting of said lever to its brake applying position, a stop, spring means normally urging said arm toward said stop, a cylinder connected with said pressure line, a piston in the cylinder, means normally urging the piston in a direction of travel opposite to that induced by pressure derived from said line, and a member interposed between said piston and said latch bar arranged to shift the bar from tooth engagement under pressure from said line, a signal circuit including a switch, and a switch operating member shifted upon travel of said arm away from said stop.

6. For a vehicle having an hydraulic brake system with a brake actuating pressure line, pressure means, a lever controlling pressure in said line, and a mechanical brake system with a rock member for actuating the brakes, the combination of an arm rockably mounted in relation to said rock member, a slide member shiftably carried by said arm, teeth on the slide member, means connecting said slide member with said lever, a latch bar on said arm normally urged into engagement with said teeth to cause said arm to move with the slide member upon shifting of said lever to its brake applying position, a stop, spring means normally urging said arm toward said stop, a cylinder connected with said pressure line, a piston in the cylinder, means normally urging the piston in a direction of travel opposite to that induced by pressure derived from said line, and a member interposed between said piston and said latch bar arranged to shift the bar from tooth engagement under pressure from said line, and an abutment on said slide member in the path of said arm to shift the arm following a predetermined travel of the slide arm with the latch bar released from said teeth.

7. For a brake system optionally operated by mechanical and hydraulic pressure means, means for actuating said hydraulic means, a member shiftable to actuate said mechanical means, latch means normally tending to interconnect both of said actuating means, means operated by pressure instituted in said hydraulic means by travel of its actuating means to hold said latch means in its disconnected condition, and means in said latch means whereby said interconnection may be made with substantially no lost motion independently of a range of positions assumed by said two actuating members due to wear and adjustments in said system, said latch means having a plurality of spaced apart connecting positions.

8. For a brake system optionally operated by mechanical and hydraulic pressure means, means for actuating said hydraulic means, a member shiftable to actuate said mechanical means, latch means normally tending to interconnect both of said actuating means, means operated by pressure instituted in said hydraulic means by travel of its actuating means to hold said latch means in its disconnected condition, and means in said latch means whereby said interconnection may be made with substantially no lost motion independently of a range of positions assumed by said two actuating members due to wear and adjustments in said system, said latch means having a plurality of spaced apart connecting positions, said latch means comprising a member guided by passing through a slot in said mechanical actuating member, and a latch bar carried by the last said member to be reciprocate in the path of the guided member, and said spaced apart position means consisting of abutments on the guided member on each side of the slot.

DON CHARLES ENGLE.
GEORGE JOHN KORFHAGE.